Oct. 2, 1962   J. A. SCOTT   3,056,734
METHOD OF MAKING A STRAIGHT THREAD
Filed March 12, 1959
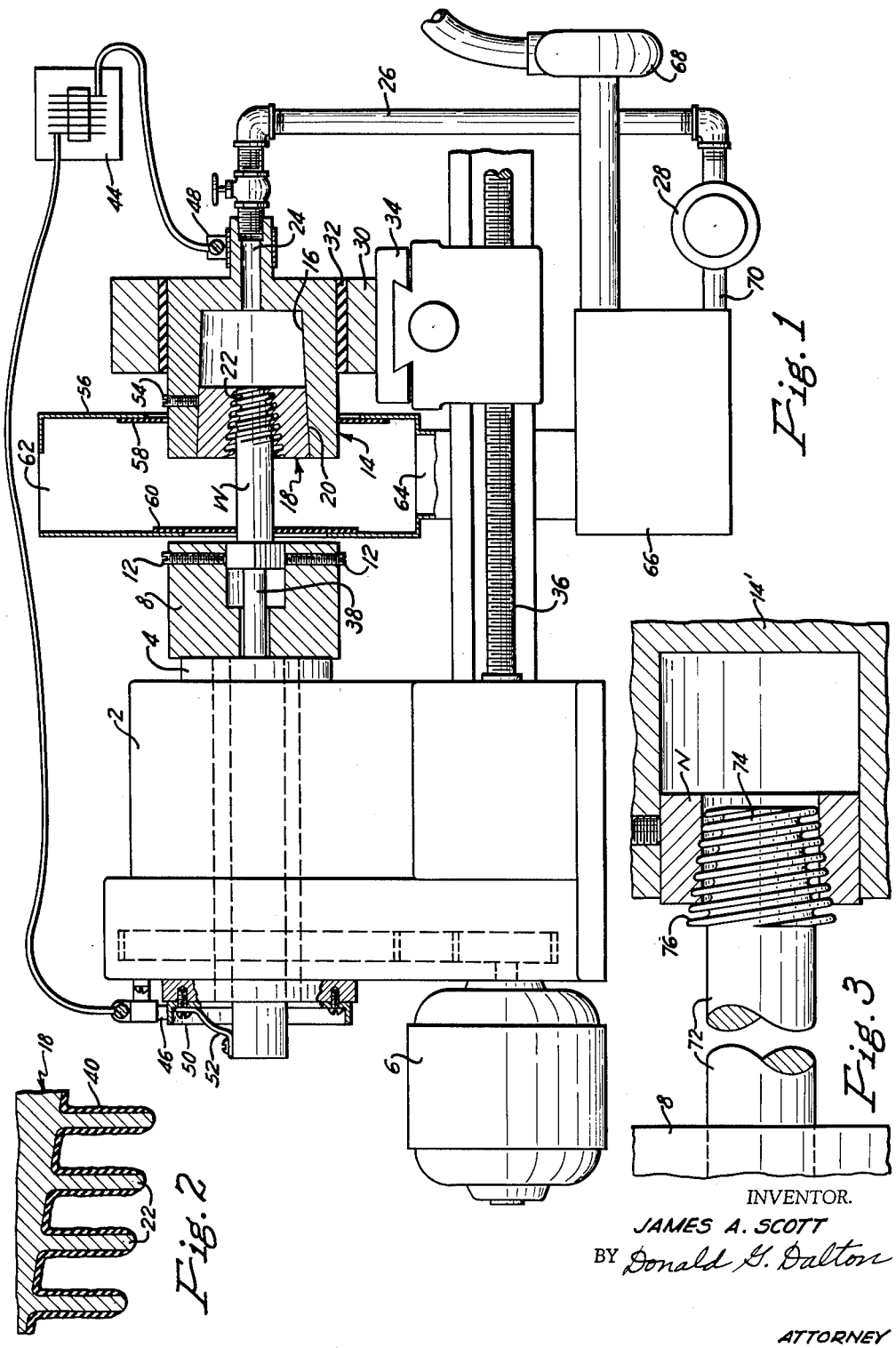
INVENTOR.
JAMES A. SCOTT
BY Donald G. Dalton
ATTORNEY 3,056,734
METHOD OF MAKING A STRAIGHT THREAD
James A. Scott, Pittsburgh, Pa., assignor to United States Steel Corporation, a corporation of New Jersey
Filed Mar. 12, 1959, Ser. No. 798,987
3 Claims. (Cl. 204—143)

This invention relates to a method of making straight threads and more particularly for making such threads on steel products. The common way of making such threads is to cut the thread by means of a tool which is generally made of high carbon steel, carbide or the like. In the cutting operation the tool becomes worn and must be resharpened periodically. The wear on the tool results in the threads on different products being non-uniform since a worn tool will not cut a thread of the same dimension as a new or resharpened tool. The cost of resharpening the tool is also a major item. The problem of tool wear becomes more important as the hardness of the metal increases. While it is old to remove metal from a workpiece by means of electrolytic action as shown in Keeleric Patent No. 2,826,540, dated March 11, 1958, and Hartley Patent No. 2,848,401, dated August 19, 1958, the cutting of threads is a very complicated procedure which raises problems not present in removing metal from workpieces such as shown in the patents.

It is therefore an object of my invention to provide a method of making straight threads without the use of a cutting tool for removing metal therefrom.

Another object is to provide a method of forming threads which, for one setup, will be uniform on successive workpieces regardless of the number of workpieces threaded.

These and other objects will be more apparent after referring to the following specification and attached drawings, in which:

FIGURE 1 is a view, partly in section, of the apparatus of my invention as used in cutting male threads;

FIGURE 2 is an enlarged detail view of the die of FIGURE 1; and

FIGURE 3 is a fragmentary sectional view showing the apparatus for cutting female threads.

Referring more particularly to the drawings, reference numeral 2 indicates the body of a lathe having a rotating spindle 4 mounted thereon. The spindle 4 may be rotated in the usual manner from a motor 6. A pot chuck 8 is mounted on the spindle 4 for rotation therewith and carries a plurality of set screws 12. Spaced from the chuck 8 is a sleeve 14 having a frusto-conical opening 16 therein for receiving a cathode die 18 having a frusto-conical outer surface 20. The die 18 has a plurality of teeth 22 on its inner surface which preferably have zero degree flanks. The sleeve 14 has an axial opening 24 in its rearward end for receiving a flexible hose 26 which is connected to a pump 28. The sleeve 14 is received in lathe block 30 and is insulated therefrom by means of insulation 32. Block 30 is mounted on saddle 34 which is movable toward and away from chuck 8 by means of lead screw 36. A workpiece W, shown as a bolt blank is centered in the chuck 8 by means of the set screws 12 and a rod 38 of brass or other electrically conducting material is mounted within the spindle 4 for rotation therewith. The rod 38 passes partially through chuck 8 with its end bearing against the head of workpiece W.

The threaded portion of the die 18 is arranged on a taper with the diameter of the crest of the thread remote from the chuck 8 being slightly greater than the root diameter of the thread to be formed and the diameter of the crest of the thread at the other end being slightly greater than the crest diameter of the thread to be formed. For best performance the differences in diameters should be between .002 and .020 inch. The crests of the threads 22 should be narrow and not exceed .03 inch. All of the surface of threads 22 should be coated with an insulating material 40 except for the spiral crests which are bare. The valleys between the crests should be of such shape and depth when insulated that they will permit the flow of the electrolyte between the workpiece and the die. A D.C. power source, such as a rectifier 44, has its positive terminal connected to brushes 46 mounted on the frame 2 and its negative terminal connected to a socket 48 mounted on sleeve 14. A collector ring 50 which is mounted on the spindle 4 for rotation therewith is contacted by the brushes 46. Cable 52 connects the collector ring 50 to the rod 38.

In operation, the die 18 is inserted into sleeve 14 in any suitable manner and locked in place as by means of a set screw 54. The workpiece W is supported in the chuck 8 and centered therein by means of the screws 12 with its free end adjacent the large diameter end of die 18. Contact between brass rod 38 and the end of workpiece W in the chuck 8 is made and a shroud 56 having rubber collars 58 and 60 thereon, is placed around the sleeve 14 and the workpiece W. The shroud 56 is preferably made of stainless steel with a window of Plexiglas or other transparent material therein. An air intake 62 is provided at the top of shroud 56. An opening 64 in the bottom of the shroud 56 leads to a sump 66. A conduit 70 leads from the sump 66 to the pump 28. The spindle 4 is then started in rotation and the lead screw 36 causes the die 18 to move forwardly over the workpiece W. At the same time electrolyte is caused to flow between the workpiece W and die teeth 22 and current is delivered from rectifier 44 to workpiece W and to the die 18. The electrolyte may be of various compositions but one found to be particularly suitable contains about 180 grams per liter of NaCl, 20 g. per liter of boric acid and 9 g. per liter of sulphuric acid. Other electrolytes which may be used include a mixture containing 180 g. per liter NaCl, 20 g. per liter of boric acid, 15 g. per liter of sulphuric acid, a composition containing 180 g. per liter of NaCl, 20 g. per liter of boric acid, a composition containing 5 g. per liter of sulphuric acid, a composition containing 20 g. per liter of sulphuric acid, and composition containing 20 g. per liter of sulphuric acid and 20 g. per liter of NaCl. The electrolyte is continuously circulated as the operation proceeds.

The exhaust fan 68 pulls air through the opening 62 and separates the air and evolved hydrogen from the electrolyte. The helical motion between the die and workpiece continues until the desired length of thread on workpiece W has passed through the small diameter end of the die.

It will be understood that any combination of motions of the workpiece and or die which will provide a screw on motion of the die to the workpiece may be used instead of the motion described above.

The length of the die should be as long as possible, but short enough to permit the trailing end of the die to finish the erosion of the desired thread length before the leading end of the die contacts the head of workpiece W.

In the embodiment of my invention shown in FIGURE 3, a cathode die 72 having a tapered forward portion 74 with teeth 76 thereon is mounted adjacent a nut blank N on which the threads are to be formed. The die threads 76 except for being male threads are essentially the same as threads 22. Nut N may be mounted in a modified sleeve 14' corresponding to sleeve 14 and the die 72 may be mounted in the chuck 8. Current can be supplied to the cathode die 72 through the chuck 8. The portion of the nut N not to be threaded is coated with an insulating material and the shank and threads of die 72 are coated with an insulating material with the threads being prepared in the same manner as the threads of die 18.

The diameter of the crest of the threads 76 adjacent the free end of the die is slightly less than the root diameter of the thread to be formed and the diameter of the crest of the thread at the other end is slightly less than the crest diameter of the thread to be formed. This difference in diameter is preferably between .002 and .020 inch. The machine is set up with the free end of the die 72 adjacent the left end of nut blank N. The machine is then started in operation as before with the nut blank N being fed over the die 72 until the threads are completely formed.

While two embodiments of my invention have been shown and described, it will be apparent that other adaptations and modifications may be made without departing from the scope of the following claims.

I claim:
1. The method of making a straight thread on a workpiece comprising providing a workpiece having a cylindrical surface to be threaded, providing a non-erodible cathode die having a helical thread thereon, the threaded portion of said die being arranged on a taper with the diameter of the crest of the thread at one end varying slightly from the root diameter of the thread to be formed and the diameter of the crest of the thread at the other end varying slightly from the crest diameter of the thread to be formed, coating all but the crest of the die threads with an insulating material, supporting the die in axial alignment with the workpiece with said other end of the die adjacent one end of the cylindrical surface of the workpiece to be threaded, the end of the die adjacent the workpiece having the diameter of the crest of the thread varying only slightly from the diameter of the cylindrical surface, then causing helical motion between said die and workpiece while flowing an electrolyte between the workpiece and die and at the same time causing a substantially constant current to flow through said electrolyte between said workpiece and die, and continuing said helical motion until the said one end of said die is adjacent the other end of the surface to be threaded.

2. The method of making a straight male thread on a workpiece comprising providing a workpiece having a cylindrical outer surface to be threaded, providing a hollow non-erodible cathode die having a helical female thread thereon, the threaded portion of said die being arranged on a taper with the diameter of the crest of the thread at one end being slightly greater than the root diameter of the thread to be formed and the diameter of the crest of the thread at the other end being slightly greater than the crest diameter of the thread to be formed, the exposed surface of the crest of the die thread being of electrical conductive material and the remaining surface of the die thread being of electrical insulating material, supporting said cathode die adjacent the workpiece in axial alignment therewith and with one end of the workpiece adjacent the large diameter end of the die, then causing helical motion between said die and workpiece while flowing an electrolyte between the workpiece and the die and at the same time causing a substantially constant direct current to flow through said electrolyte between said workpiece and said die, and continuing said helical motion until the other end of the surface to be threaded is adjacent the small diameter end of the die.

3. The method of making a straight female thread on a workpiece comprising providing a workpiece having an inner cylindrical surface to be threaded, providing a non-erodible cathode die having a helical male thread thereon, the threaded portion of said die being arranged on a taper with the diameter of the crest of the thread at one end being slightly less than the root diameter of the thread to be formed and the diameter of the crest of the thread at the other end being slightly less than the crest diameter of the thread to be formed, the exposed surface of the crest of the die thread being of electrical conductive material and the remaining surface of the die thread being of electrical insulating material, supporting said cathode die adjacent the workpiece in axial alignment therewith and with one end of the workpiece adjacent the small diameter end of the die, causing helical motion between said die and workpiece while flowing an electrolyte between the workpiece and die and at the same time causing a substantially constant direct current to flow through said electrolyte between said workpiece and die, and continuing said helical motion until the other end of the surface to be threaded is adjacent the large diameter end of the die.

References Cited in the file of this patent

UNITED STATES PATENTS

| 2,526,423 | Rudorff | Oct. 17, 1950 |
| 2,650,979 | Teubner | Sept. 1, 1952 |
| 2,739,935 | Kehl et al. | Mar. 27, 1956 |
| 2,773,968 | Martellotti et al. | Dec. 11, 1956 |
| 2,798,846 | Comstock | July 9, 1957 |
| 2,868,705 | Baier et al. | Jan. 13, 1959 |

FOREIGN PATENTS

| 789,293 | Great Britain | Jan. 15, 1958 |
| 661,273 | Great Britain | Nov. 21, 1951 |

OTHER REFERENCES

"Steel," February 21, 1944, page 92.